United States Patent [19]
Brandt et al.

[11] Patent Number: 5,758,068
[45] Date of Patent: May 26, 1998

[54] METHOD AND APPARATUS FOR SOFTWARE LICENSE MANAGEMENT

[75] Inventors: Marcia Lynn Brandt; George Francis Destefano; Eric Leonard Fosdick; Ramila Alexandra Mehta; Teresa McConville Prokop, all of Rochester; Kevin Patrick Stamschror, Wabasha, all of Minn.

[73] Assignee: International Business Machines Corporation, Armonk, N.Y.

[21] Appl. No.: 530,048

[22] Filed: Sep. 19, 1995

[51] Int. Cl.$^6$ ............................................. G06F 13/00
[52] U.S. Cl. ............................ 395/186; 380/4; 380/25
[58] Field of Search ...................... 380/4, 25; 395/186, 395/187.01, 188.01

[56] References Cited

U.S. PATENT DOCUMENTS

| | | | |
|---|---|---|---|
| 4,438,824 | 3/1984 | Mueller-Schloer | 380/23 |
| 4,458,315 | 7/1984 | Uchenick | 380/4 |
| 4,471,163 | 9/1984 | Donald et al. | 380/4 |
| 4,634,807 | 1/1987 | Chorley et al. | 380/4 |
| 4,646,234 | 2/1987 | Tolman et al. | 380/4 |
| 4,658,093 | 4/1987 | Hellman | 380/25 |
| 4,683,968 | 8/1987 | Appelbaum et al. | 380/4 |
| 4,740,890 | 4/1988 | Tobin | 380/4 X |
| 4,791,565 | 12/1988 | Dunham et al. | 380/4 X |
| 4,888,798 | 12/1989 | Earnest | 380/4 |
| 4,924,378 | 5/1990 | Hershey et al. | 395/187.01 |
| 4,941,175 | 7/1990 | Enescu et al. | 380/4 |
| 4,959,861 | 9/1990 | Howlette | 380/4 |

(List continued on next page.)

OTHER PUBLICATIONS

IBM Technical Disclosure Bulletin, vol. 37, No. 04B, Apr. 1994, "Variable Expiration Dates on a Specific Executable".
IBM Technical Disclosure Bulletin, vol. 37, No. 08, Aug. 1994, "Customizable License Compliance Mechanism".

*Primary Examiner*—Thomas H. Tarcza
*Assistant Examiner*—Pinchus M. Laufer
*Attorney, Agent, or Firm*—Andrew J. Dillon

[57] ABSTRACT

A license key with method of implementation is disclosed. The license key is used for accessing a licensed product on an enterprise computer system. Typically, the enterprise computer system includes a plurality of computer systems, but the computer systems are not necessarily interconnected. A first identifier code from the enterprise computer system, such as the system serial number, is used for allowing the license key to identify the enterprise. A second identifier code from a computer within the enterprise system is used, which is typically a serial number from the computer to identify it to the license key as being part of the enterprise system. Lastly, a third identifier code is used, which is selected from the licensed product to be used on the enterprise system and is tied to the enterprise system number, thereby allowing the licensed program to be accessed on the enterprise system with only a single key, irrespective of the number of computers accessing the licensed program. The setup of the license key, along with calling the identifier codes from the enterprise system, each computer, and the license product, is performed by a license manager, which also provides other services based upon the license key. The license manager provides either usage control, access control, or both, based upon information generated by the license key and found within a product information packet provided with the licensed product and based upon the enterprise system.

6 Claims, 6 Drawing Sheets

U.S. PATENT DOCUMENTS

| | | | |
|---|---|---|---|
| 5,014,234 | 5/1991 | Edwards, Jr. | 395/186 |
| 5,023,907 | 6/1991 | Johnson et al. | 380/4 |
| 5,081,675 | 1/1992 | Kittirutsunetorn | 380/4 |
| 5,081,676 | 1/1992 | Chou et al. | 380/4 |
| 5,103,476 | 4/1992 | Waite et al. | 380/4 |
| 5,138,712 | 8/1992 | Corbin | 395/186 |
| 5,199,066 | 3/1993 | Logan | 380/4 |
| 5,204,897 | 4/1993 | Wyman | 380/4 |
| 5,222,134 | 6/1993 | Waite et al. | 380/4 |
| 5,260,999 | 11/1993 | Wyman | 380/4 |
| 5,276,738 | 1/1994 | Hirsch | 380/46 |
| 5,287,408 | 2/1994 | Samson | 380/4 |
| 5,293,422 | 3/1994 | Loiacono | 380/4 |
| 5,319,705 | 6/1994 | Halter et al. | 380/4 |
| 5,337,357 | 8/1994 | Chou et al. | 380/4 |
| 5,341,429 | 8/1994 | Stringer et al. | 380/23 |
| 5,390,297 | 2/1995 | Barber et al. | 380/4 X |
| 5,530,752 | 6/1996 | Rubin | 380/4 |
| 5,553,139 | 9/1996 | Ross et al. | 380/4 |
| 5,553,143 | 9/1996 | Ross et al. | 380/25 |
| 5,563,946 | 10/1996 | Cooper et al. | 380/4 |
| 5,671,412 | 9/1997 | Christiano | 395/615 |

```
                    Add License Information (ADDPRDLICI)

Type choices, press Enter.

Product ID . . . . . . . . . . . .   _____         Identifier
Release level  . . . . . . . . . .   ____             VxRxMx
Feature  . . . . . . . . . . . . .   5001             5001-9999
Usage type . . . . . . . . . . . . > *REGISTERED     *CONCURRENT,
  *REGISTERED
Compliance type  . . . . . . . . . > *KEYED          *OPRACTION,
  *WARNING, *KEYED
Protection type  . . . . . . . . . > *USAGE          *USAGE, *ACCESS,
  *BOTH
Default usage limit  . . . . . . .   1               0-999999, *NOMAX
License term . . . . . . . . . . .   *VERSION        *VERSION, *RELEASE,
  *MOD
Feature message ID . . . . . . . .   *NONE           Identifier
Allow license release  . . . . . .   *NO             *NO, *YES
Vendor password  . . . . . . . . .   *NONE           Name , *NONE
Grace period:
  Number of days . . . . . . . . .   0               0-999
  Allow for default usage limit  .   *NO             *NO, *YES
```

Fig. 6

```
                Generate License Key (GENLICKEY)

Type choices, press Enter.

Product ID . . . . . . . . . . . . . _____               Identifier
License term . . . . . . . . . . . . _____               Vx, VxRy,
  VxRyMz
Feature  . . . . . . . . . . . . . . _____               5001-9999
Vendor password  . . . . . . . . . . *ANY                 Name, *NONE
System serial number . . . . . . . . *NONE                Number
Processor Group  . . . . . . . . . . _____              Number
Expiration date  . . . . . . . . . . *NONE                Date, *NONE
Usage limit  . . . . . . . . . . . . 1                    0-999999, *NOMAX
Vendor data  . . . . . . . . . . . . *NONE                Character value,
  *NONE
Output . . . . . . . . . . . . . > *LICKEYFILE            *, *PRINT,
  *LICKEYFILE
  *CURLIB
```

*Fig. 7*

METHOD AND APPARATUS FOR SOFTWARE LICENSE MANAGEMENT

BACKGROUND OF THE INVENTION

1. Technical Field

The present invention relates to data processing systems and, more particularly, to a management scheme for software licenses operating on the data processing systems.

2. Description of the Related Art

Current state of the art software license protection methods support software license enforcement based on a "license key" concept. A license key, herein referenced as "key," is an encrypted string that contains information such as, for example, the software product's ID, the software product's entitled usage limit and expiration date, and the serial number of the system where the key may be installed. Computer enterprises, which consist of multiple systems, are supported using either of the two following methods.

Firstly, a key is created, then distributed, then installed, for each licensed software product on each system. Unfortunately, this method can result in a large number of keys that are often quite difficult to manage. For example, an enterprise with 11,000 systems and three software packages would need 33,000 unique keys. In order to reduce the number of keys, some vendors offer a key that is not based on a system serial number and that can be installed on any system. For this example, only three keys would then be needed, meaning one per licensed product. Unfortunately, this approach offers no asset protection at all since the key can literally unlock the software to run on any system in the world.

Secondly, a network license key for each licensed product may be placed on a network server and the systems within the enterprise share this key. While this approach reduces the number of keys needed to three, it also creates the problem that all the systems must be connected and it also makes each system highly dependent on the availability and performance of the network and the network licensed server. This can be quite objectionable if the software itself, such as, for example, a word processing system, does not depend on the network.

Another issue facing software licensing management is that of enforcing both usage control and access control via software keys. All current key-based license management methods support either usage control or access control, but not both. This requires that both developers and customers must interface to two disparate methods.

In usage control, a software product protects itself at run time by making calls to a licensed manager that accesses a stored license key to see if the terms and conditions of the license are being met. For example, if only four (4) current users are allowed then the license manager tells the software product when the fourth user has signed on. This form of protection is common for usage-based pricing.

In access control, the software product is protected by encrypting it in the distribution media and requiring the user to type in a key to decrypt it and retrieve it from the media. This form of protection is common for products that are not usage priced or that do not actually contain executable code. For example, a set of fonts or dictionaries on a CD-ROM would be good candidates for access control.

As software moves to high density CD-ROM for software distribution, there is a distinct cost advantage to being able to offer both usage-based and access-based software on the same CD. Unfortunately, there currently is no one scheme or license management product that supports both usage and access control with one key. Instead, the customer must deal with an access control license manager that has its own unique key format and then with a usage control license manager with its unique interface and keys.

Another issue facing license management is that of providing a customer with a grace period in which to try new software or, to extend the usage limit of existing software on a particular system or enterprise. Current key-based licensed management methods provide a mechanism by which usage priced application programs can determine if a valid key exists and determine if the usage limit has been reached. It is then left up to each application to decide if the user can continue without a key or whether the user can exceed the usage limit. No support is provided in the applications to enable and monitor a grace period. A grace period is typically defined to be a vendor specified period in which an application can run without a key or can exceed its usage that is embedded in the key.

When this support is left to the application, this places a severe burden on the application, which is why applications today do not support grace periods. For example, an application would have to record the first occurrence of not having a key, start a timer, monitor the timer, reset the timer when the key is installed, and do all to this across multiple instantiations, assuming the application is run by multiple users on one system or on several connected systems. A grace period support for exceeding the usage time limit would then be just as complicated. For example, an application would have to record the first occurrence of exceeding the usage limit, start a time, monitor the timer, monitor usage while the timer was running to see if it fell below the limit, decide what to do if usage did fall below the limit, and reset the timer when a new key was installed. Furthermore, an application would have to contain logic for the situation where the limit in the new key was not greater than the current usage. Furthermore, by delegating support to each application, there is less likelihood of consistency between each application and the total cost for the vendor of multiple applications becomes greater.

Accordingly, what is needed is a software licensing method for use on an enterprise system that provides an enterprise key that avoids the complexity associated with other mechanisms or that does not become unduly simple to override or access. Additionally, what is needed is a way of providing access control without being solely dependent upon one control protocol or the information manager as is required in current systems. Further, what is needed is a method that simplifies the management of grace periods without burdensome and inconsistent protocols.

SUMMARY OF THE INVENTION

It is therefore one object of the present invention to provide a data processing system.

It is another object of the present invention to provide a management scheme for software licenses operating on the data processing systems.

It is yet another object of the present invention to provide the enforcement of software licenses across all systems within an enterprise.

The foregoing objects are achieved as is now described. According to the present invention, a license key with method of implementation is disclosed. The license key is used for accessing a licensed product on an enterprise computer system. Typically, the enterprise computer system includes a plurality of computer systems, but the computer systems are not necessarily interconnected. A first identifier code from the enterprise computer system, such as the system serial number, is used for allowing the license key to identify the enterprise. A second identifier code from a computer within the enterprise system is used, which is typically a serial number from the computer to identify it to the license key as being part of the enterprise system. Lastly, a third identifier code is used, which is selected from the licensed product to be used on the enterprise system and is tied to the enterprise system number, thereby allowing the licensed program to be accessed on the enterprise system with only a single key, irrespective of the number of computers accessing the licensed program.

The setup of the license key, along with calling the identifier codes from the enterprise system, each computer, and the license product, is performed by a license manager, which also provides other services based upon the license key. The license manager provides either usage control, access control, or both, based upon information generated by the license key and found within a product information packet provided with the licensed product and based upon the enterprise system.

The access control may include encrypting data within the licensed program that can only be decrypted with the license key. The encrypted data is only a sparse portion of the license program. The usage control may include a grace period that, upon expiration, is only extendable by way of the license key.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 6 depicts a prompt for a command that enables a vendor to package license information within a licensed program.

FIG. 7 depicts a prompt for a command that enables a vendor to create a key for a licensed program.

DETAILED DESCRIPTION OF THE PREFERRED EMBODIMENT

Figure 1:
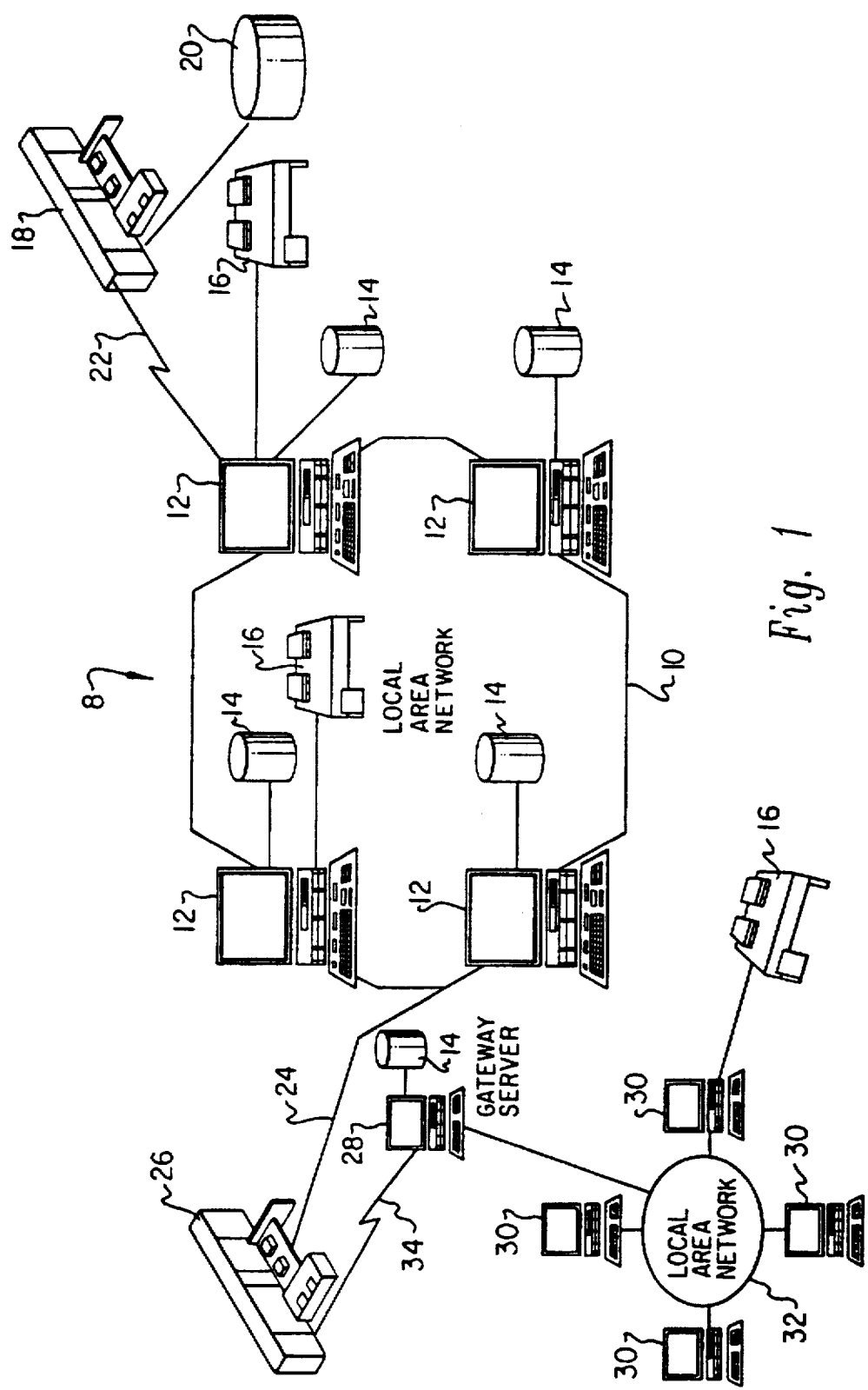
FIG. 1 depicts in accordance with a preferred embodiment of the present invention, a distributed data processing system.

With reference now to the figures and in particular with reference to FIG. 1, there is depicted a pictorial representation of a distributed data processing system 8 or enterprise, which may be utilized to implement the method and system of the present invention. As may be seen, distributed data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store the various data objects or documents which may be periodically accessed and processed by a user within distributed data processing system 8, in accordance with the method and system of the present invention. In a manner well known in the prior art, each such data processing procedure or document may be stored within a storage device 14 which is associated with a Resource Manager or Library Service, which is responsible for maintaining and updating all resource objects associated therewith.

Still referring to FIG. 1, it may be seen that distributed data processing system 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10. A second Local Area Network (LAN) 32 may be coupled to Local Area Network (LAN) 10 via communications controller 26 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data processing procedures or documents may be stored within storage device 20 and controlled by mainframe computer 18, as Resource Manager or Library Service for the data processing procedures and documents thus stored.

Of course, those skilled in the art will appreciate that mainframe computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and mainframe computer 18 may be located in New York.

As will be appreciated upon reference to the foregoing, it is often desirable for users within one portion of distributed data processing network 8 to access a data object or document stored in another portion of data processing network 8. In order to maintain a semblance of order within the documents stored within data processing network 8 it is often desirable to implement an access control program. This is generally accomplished by listing those users authorized to access each individual data object or document, along with the level of authority that each user may enjoy with regard to a document within a Resource Manager or Library Service. In this manner, the data processing procedures and documents may be accessed by enrolled users within distributed data processing system 8 and periodically "locked" to prevent access by other users.

The system shown in FIG. 1 constitutes an enterprise in that each computer system is commonly associated with a particular business or enterprise. Since they are all similarly associated, a unique identification (ID) number is assigned to the enterprise. The ID may be any number mutually agreed to by the software vendor and the enterprise owner. Since keys are normally based on system serial numbers (to restrict installation of the keys to that system), one convention is to base the ID on the serial number of some system in the enterprise, but to modify it in such a way as to indicate that it is an Enterprise Key. On the AS/400 System implementation, for example, an Enterprise ID may be XX-55346 where the 55346 is the serial number of an AS/400 system in the enterprise and XX indicates that it is an enterprise key.

Next, for each licensed program (LP) covered by an enterprise licensing agreement, a key is issued that ties that particular LP to that enterprise's ID. For example, if an enterprise needed licenses for three LPs on 1000 systems, it would need only one key for each LP (instead of the 1000 for each LP if each key was based on a unique system serial number) with each key based on the enterprise ID.

Figure 2:
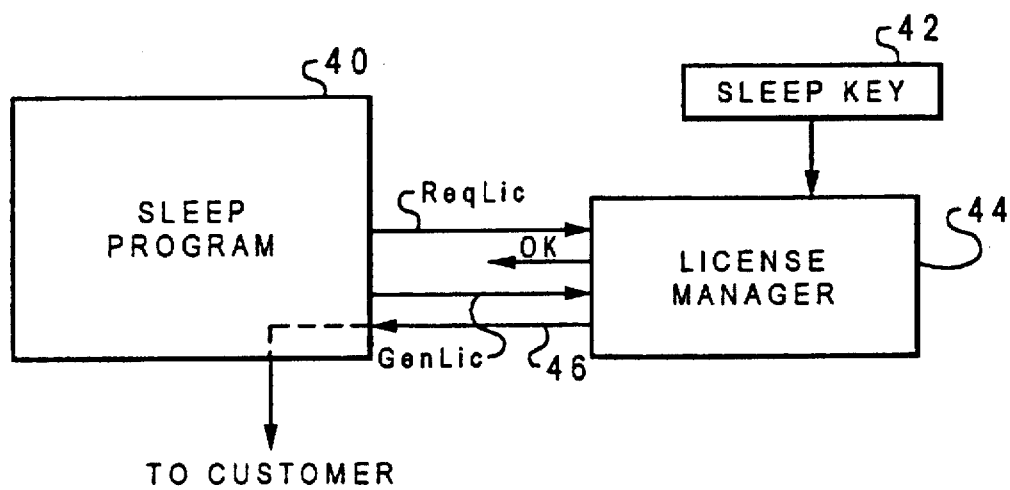
FIG. 2 depicts the role of the license manager in supporting enterprise licensing.

In order to direct the license manager in each system to accept enterprise ID-based keys, a Software License Enterprise Enabler Program (SLEEP) 40 is provided. As shown in FIG. 2, the SLEEP 40 itself is key protected and will only run in the presence of a sleep key 42 that ties it to a particular system. When SLEEP 40 runs on that system, it creates an Enterprise Key based on the serial number of the system it runs on and on the enterprise ID. This key 42 can then be installed on any system in the enterprise and its presence on any system will indicate to the license manager 44 that licenses for other LPs (based on that Enterprise key) should also be honored. Another way of looking at this design is to say that license manager 44 has dormant (or 'sleeping') support for enterprise licensing and only needs SLEEP-created key 42 to unlock that support.

Figure 3:
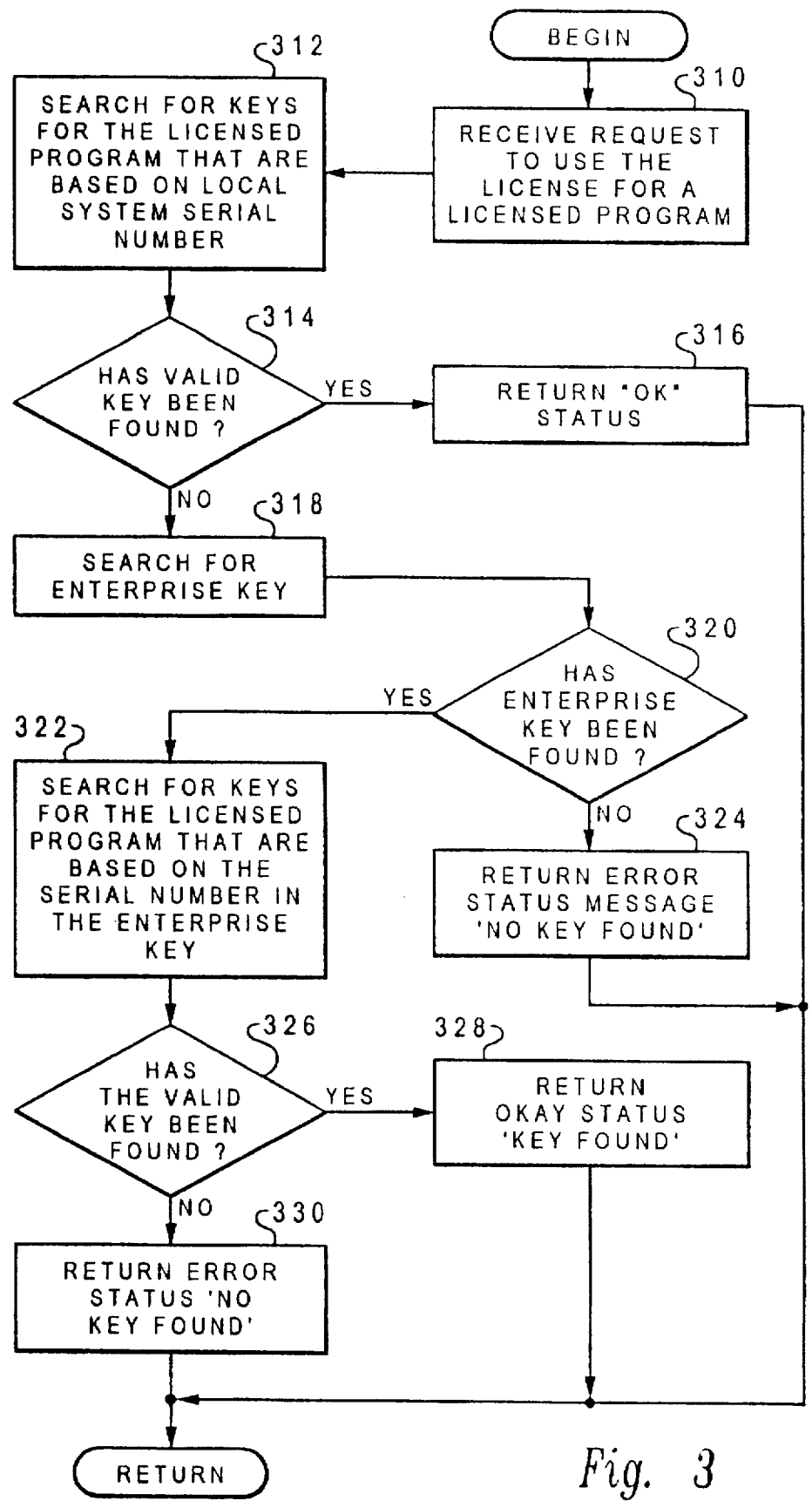
FIG. 3 depicts the logic flow utilized by the license manager in supporting enterprise licensing.

The actual use of enterprise key 42 by license manager 44 is depicted in the flowchart of FIG. 3. License manager 44 in step 310, receives a request to use the license for a licensed program for a (LP). Next, in step 312, the system searches for keys 42 for the licensed program that are based on a local system serial number. Next, in step 314 the system determines whether a valid key has been found, and if so, in step 316 returns an okay status. Otherwise, if no valid key is found, the system, in step 318 searches for the enterprise key. If the system finds the enterprise key, as depicted at step 320, the system proceeds to step 322; otherwise, if no enterprise key is found, the system sends an error status of no key found in step 324 as illustrated at reference numeral 46 in FIG. 2. In step 322, the system searches for keys for the licensed program that are based on the serial number in the enterprise key. In step 326, the system determines if a valid key has been found and, if so, in step 328 returns an okay status of "key found." If no valid key has been found, the system in step 330 return an error status of "no key found."

One advantage of the enterprise key is that it is marked as having been generated on a particular system. This mark, or serial number of the system, is proof of when and where the key was generated and is used to determine if and how the software was stolen in such an event. Additionally, the enterprise key does not require a complete network connection (the same key can be installed on every system in the enterprise) in order to access a licensed product from anywhere within the enterprise. This minimizes the number of unique licenses that must be managed.

The next area of concern in the license management method is to be able to enforce both usage control and access control via the software keys. Typically, an operating system can support usage control or access control, but not both. For example, the prior art operating system typically used in the enterprise shown in FIG. 1 did support key based usage control. The invention, as discussed below, also extends the key based usage control to support access control with the same license keys and user interface. This allows both the software developer and the customer to deal with just a single method and key format to obtain access control, rather than several or at least two different methods.

Usage control is where the operating system protects itself by making calls to a license manager to determine if the software is running on the correct system or within certain usage limits as determined by a license key, or both.

Access control is where the data on the distribution media are encrypted and can only be decrypted by "installing" software via information in a license key. Access control is often used for non-executing software, such as priced on-line books, fonts, and dictionaries.

In order to provide both access control and usage control, encryption and decryption considerations must be addressed. Therefore, the operating system as used in the present invention is built so as to include encryption/decryption support, which is available to the enterprise components via a Cipher Machine Interface (MI) instruction set. The term "Cipher" is well known in cryptography. Both the encryption and decryption elements are illustrated in the flow diagram of FIG. 4.

Figure 4:
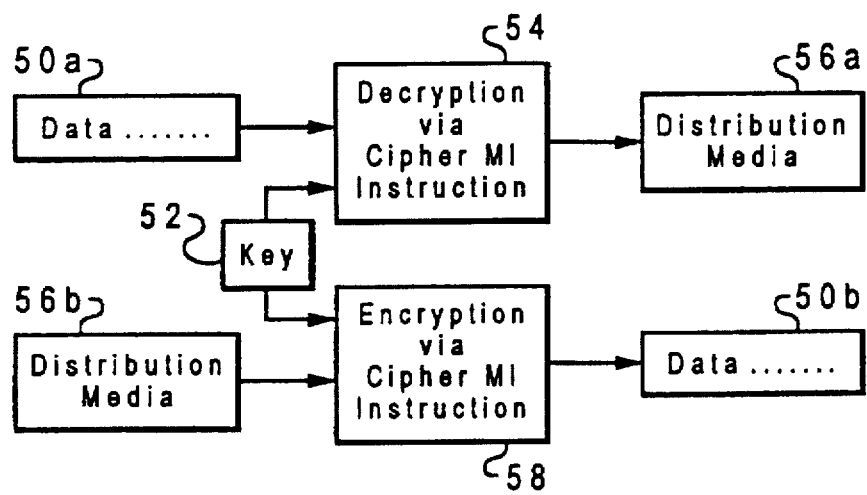
FIG. 4 depicts the role of the key and encryption in access control.

FIG. 4 is a flow diagram showing the use of the cipher MI set of encryption and decryption techniques as used by the vendor and the customer. On one side is the vendor's development system while on the other side is the customer's system, and between the two are the encryption and decryption techniques according to the present invention. In block 50a, data are provided that are information that is ready to be written into the distribution media 56a. In block 52, a proprietary key is generated that is known only by the vendor. The key is used to decrypt the data via the Cipher Machine Interface (MI) instruction set in block 54. The resultant decrypted data is then written to the distribution media in block 56.

On the customer side, the same distribution media 56 is now ready to be installed on another system as shown in block 56b. This information is encrypted via cipher MI instruction set 58 using the same key of block 52. The resultant data 50b is the same data as originally provided in data 50a. To minimize performance degradation during installation, the data are sparsely decrypted. That is, for example, only 64 of every 2,048 bytes are to be decrypted. This is consistent with other access protection schemes.

To provide access control for licensed programs, the licensed programs are packaged according to a system management services (SMS) packaging method used in the operating system of the enterprise in FIG. 1. The SMS packaging is required of licensed programs in order to make them installable and serviceable. The block diagram in FIG. 5 further illustrates the hierarchy of the operating system including SMS packaging method. To begin, a licensed product 62 consists of various operating system objects 64 such as programs, files and commands. The developer ties these objects together into a package via a product packaging information routine 66, which is one of the system objects of the operating system. The packaging information 64 describes the product name, ID, options, and other information needed to be able to install, service, and protect the licensed product. The packaging information is created via commands shown in routine 66. The AddLicInf command defines basic licensing information such as the vendor password, which is used in validating keys, and whether it is usage controlled, access controlled, or both. The ChgPrdObjD (Change Product Object Description) is used to mark objects for inclusion in the package. This command is also modified to mark which objects are to be accessed protected. For performance reasons, it is not reasonable to protect all the objects in a package, so the developer marks just enough objects to protect the product. Next, the save license program (SavLicPgm) command 70 writes the product to media 72 in the appropriate operating systems save/restore format. If the developer specifies encryption, via a parameter in SavLicPgm, then those objects marked in the previous step are decrypted just prior to writing them to the media. The product packaging information object, however, is then written to the media in non-encrypted form and "access header" file is then written to media 72 as an indicator of what objects were decrypted.

Once the product packaging information object has been written to media 72, license key manager 74 then generates a key, up to N keys, for the number of licensed programs that are used in the system. Add License key (AddLickey) program 76 performs the keying operation which is based on the restored licensed program (RstLicPgm) 78 sent from media 72.

FIG. 6 is a sample list of an add license information list as prepared by the add product license information (AddPrdLicl) command within the operating system of the enterprise. This command adds license information to the product or feature and adds a new "protection type" parameter. In completing the add product license information, the vendor provides a product ID, release level, feature, and usage type. Additionally, the vendor provides registered information such as what type of compliance is required, whether it is keyed or not. Additionally, a warning is provided, which may be keyed and distinguishes the protection type being either usage of access. Further, both protection types may be used as noted by the default usage limit and the license term. Additionally modifications are also provided, such as a feature message ID, allow license release, a vendor password, and a grace period, which may be for a number of days or for a default usage and limit.

The protection type added in the add license information of FIG. 6 allows that a product can be packaged to support access control, usage control, or both. Further, the access control is always key-based and the compliance type parameter applies only to usage control. Likewise, the following parameters have no meaning for products that are only access controlled; these are usage type, allow license release, default usage limit and grace period.

Next, FIG. 7 shows the field for the GenLicKey command. Within the Generate License Key command, the product ID and license term are provided. The license term can be either for version (Vx), version/release (VxRy), or a version/release/mode (VxRyMz) level. The system serial number is important in that the product is keyed to a system serial number, meaning that the program can only be installed on the system with that particular serial number. The processor field group assures that the software is being installed on the correct processor group. This is useful for software that is tier priced. A usage limit field is also provided, which is ignored for products that are only access protected.

Figure 5:
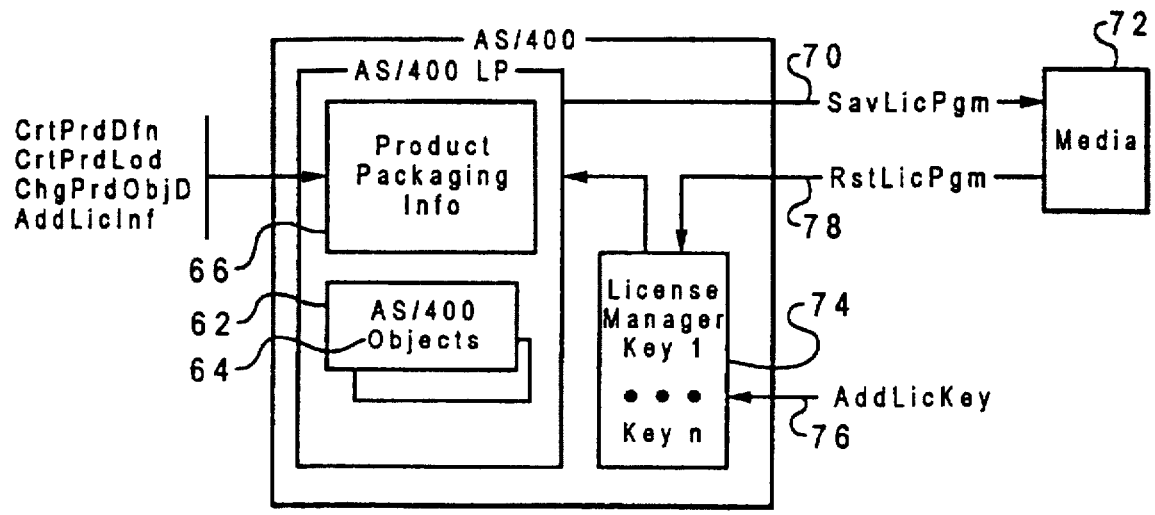
FIG. 5 depicts the relationship of license information to the license manager and to the licensed programs.

Two more commands used during installation, as shown in FIG. 5 as well, are Save License Program (SavLicPgm) 70 and Restore License Program (RstLicPgm) 78. The Save License Program 70 includes an access protect parameter, that if set to yes, allows those objects marked for access control to be decrypted prior to writing them to media 72. This command also writes "access header" file to the media. This file contains a list of the objects that were decrypted. And the list is then used by the Restore License Program to determine which objects need to be encrypted at installation time.

The Restore License Program (RstLicPgm) 78 command restores the product packaging information object and the "access header" file from the media. Next, the program then determines which objects in the product need to be encrypted prior to restorating or installation.

The key data is protected in that the information on the media can only be installed on a given serial-numbered system. The customer must have a key for each system on which the media is to be used. If the customer attempts to restore objects by bypassing the RstLicPgm interface, which can be done via the RstLib and RstObj commands, the objects will not restore correctly because they will be in decrypted form and those particular commands do not support encryption.

Moreover, once the software is installed on the particular host enterprise system, there is nothing that can stop the customer from saving the information to other media and installing the software on another system. Likewise, if the software is really client coded that is downloaded to a PC, there is nothing that can stop the customer from using a portable, copyable media to distribute the client code.

Figure 8:
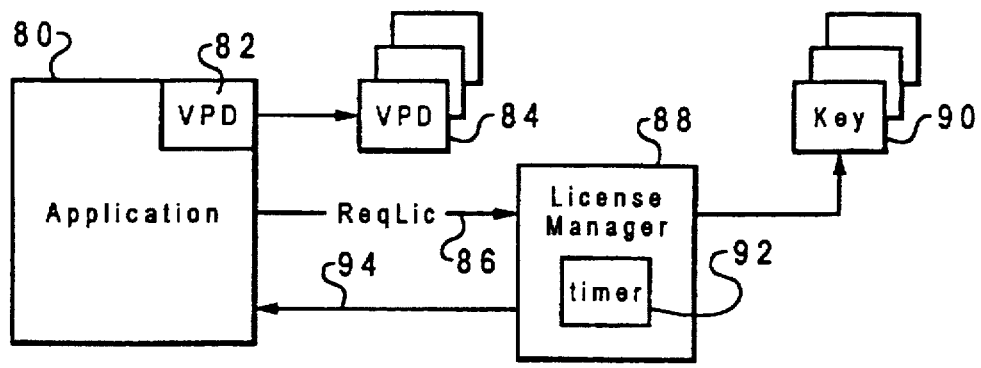
FIG. 8 depicts a license manager with a built-in timer used for supporting a grace period.

The next area of concern addressed by the present invention is that of providing grace period support. The license management functionality further supports a vendor specified grace period for the situation where there is no key and the usage limit has been exceeded. The vendor need only indicate the grace period within the application vital product data and monitor for messages or return codes for the license manager. All counting, reporting, administration is handled by the license manager. This is easily integrated by the application developer since it is already required for the key based license management application described above. FIG. 8 is a block diagram illustrating the grace period features according to the present invention.

In FIG. 8, an application program 80 contain vital product data 82 that describes application 80. Vital product data 82 consists of the product ID, version, installation directions, and basic license information such as the grace period. Vital product data 82 is collected and stored in storage means 84 when application 80 is installed. When application 80 requests the right to run according to ReqLic command 86, the request is sent to the license manager 88. License manager 88 checks the presence of a key 90 and if no key 90 is found, license manager 88 starts a timer 92 within license manager 88 for that application 80 and then responds 94 back to application 80. If vital product data 82 for that application 80 indicates a 30-day grace period, then response 94 would indicate that the user has 30 days in which to install a key for the application. License manager 88 decrements timer 92 every day for 30 days and any attempt to use the application during that time will result in a response 94 that indicates how many days are left in the grace period. At the end of the grace period, the response from license manager 88 changes to an error response, at which time, application 80 would reject further requests for use.

In effect, the grace period allows the application developer to institute a shareware try and buy policy. The customer is free to try an application during the grace period and can purchase a key for continued use later once the grace period has ended since a license key has been added for license management. In the event of a valid key being found, the steps followed are the same as previously described. In this example, the usage limit, which is protected by the key, has been exceeded. In other words, a fifth person, for example, has invoked the application whose key entitles only four users. For this case, license manager 88 starts a timer and responds back to the application. The response indicates that the user has 30 days in which to install a new, larger key for the application. The timer is decremented every day and additional requests during that time will indicate how many days are left in the grace period. At the end of the grace period, the response changes to an error response, at which time, the application then rejects further requests for use beyond the keyed limit. This allows the enterprise to have increased use of an application for a controlled period until such a time as that which the customer needs to obtain a key.

While the invention has been particularly shown and described with reference to a preferred embodiment, it will be understood by those skilled in the art that various changes in form and detail may be made therein without departing from the spirit and scope of the invention.

We claim:

1. A method for software license management for a licensed program within an enterprise computer system which includes a plurality of computers, said method comprising the steps of:

generating a first identifier code utilizing at least a portion of a serial number associated with said enterprise computer system;

generating a second identifier code within said enterprise computer system utilizing at least a portion of a serial number associated with a computer within said enterprise computer system and at least a portion of said first identifier code;

generating a third identifier code associated with said licensed program utilizing at least a portion of said first identifier code and at least a portion of said second identifier code; and controlling usage of said licensed program at any point within said enterprise computer system utilizing either said first identifier code in combination with said third identifier code or said second identifier code in combination with said third identifier code such that usage of said licensed program may be controlled throughout said enterprise computer system irrespective of the number of computers within said computer system.

2. The method for software license management according to claim 1, wherein said step generating a third identifier code associated with said license program further comprises the step of utilizing at least a portion of a serial number associated with said licensed program to generate said third identifier code.

3. A method for software license management for a license program within an enterprise computer system according to claim 1, wherein said step of controlling the usage of said licensed program at any point within said enterprise computer system utilizing either said first identifier code in combination with said third identifier code or said second identifier code in combination with said third identifier code further comprises the step of providing a grace period of use that, upon expiration, is extendable.

4. A computer program product for software license management for a licensed program within an enterprise computer system, said computer program product embodied within computer-readable media adapted to be utilized within a computer, said computer program product comprising:

instruction means generating a first identifier code utilizing at least a portion of a serial number associated with said enterprise computer system;

instruction means generating a second identifier code within said enterprise computer system utilizing at least a portion of a serial number associated with said computer and at least a portion of said first identifier code;

instruction means generating a third identifier code associated with said licensed program utilizing at least a portion of said first identifier code and at least a portion of said second identifier code; and instruction means controlling usage of said licensed program at any point within said enterprise computer system utilizing either said first identifier code in combination with said third identifier code or said second identifier code in combination with said third identifier code such that usage of said licensed program may be controlled throughout said enterprise computer system irrespective of the number of computers within said computer system.

5. The computer program product according to claim 4, wherein said instruction means for generating a third identifier associated with said licensed program further comprises instruction means for utilizing at least a portion of a serial number associated with said licensed program.

6. The computer program product according to claim 4, wherein said instruction means for controlling the usage of said licensed program at any point within said enterprise computer system utilizing either said first identifier code in combination with said third identifier code or said second identifier code in combination with said third identifier code further comprises instruction means for providing a grace period of use that, upon expiration, is that, upon expiration, is extendable.

* * * * *